(12) United States Patent
Fukuyama

(10) Patent No.: US 8,572,422 B2
(45) Date of Patent: Oct. 29, 2013

(54) DISK ARRAY APPARATUS INCLUDING INSERTION/EXTRACTION DETECTION FUNCTION OF THE CONNECTOR

(75) Inventor: Osanori Fukuyama, Tokyo (JP)

(73) Assignee: NEC Corporation, Tokyo (JP)

(*) Notice: Subject to any disclaimer, the term of this patent is extended or adjusted under 35 U.S.C. 154(b) by 178 days.

(21) Appl. No.: 12/871,020

(22) Filed: Aug. 30, 2010

(65) Prior Publication Data

US 2011/0051276 A1　Mar. 3, 2011

(30) Foreign Application Priority Data

Sep. 1, 2009　(JP) ................................ 2009-201553

(51) Int. Cl.
　*G06F 1/00*　(2006.01)
　*G06F 1/32*　(2006.01)

(52) U.S. Cl.
　CPC .................................. *G06F 1/3203* (2013.01)
　USPC .......................................... 713/324; 713/322

(58) Field of Classification Search
　USPC .......................... 710/300–304; 713/300–340
　See application file for complete search history.

(56) References Cited

U.S. PATENT DOCUMENTS

| | | | | |
|---|---|---|---|---|
| 5,708,771 A * | 1/1998 | Brant et al. | ....................... | 714/22 |
| 5,983,298 A * | 11/1999 | Schultz et al. | ................. | 710/302 |
| 6,062,480 A * | 5/2000 | Evoy | .............................. | 235/492 |
| 6,700,829 B2 * | 3/2004 | Abe et al. | ....................... | 365/226 |
| 7,096,372 B2 * | 8/2006 | Sone | ............................ | 713/300 |
| 7,243,248 B1 * | 7/2007 | Roux et al. | .................... | 713/300 |
| 7,970,972 B2 * | 6/2011 | Takahashi | ...................... | 710/301 |
| 2003/0093605 A1 * | 5/2003 | Abe et al. | ....................... | 710/302 |
| 2003/0217300 A1 * | 11/2003 | Fukumori et al. | ............ | 713/300 |
| 2004/0019710 A1 * | 1/2004 | Kolli et al. | ...................... | 710/19 |
| 2005/0081068 A1 * | 4/2005 | Sakakibara et al. | .......... | 713/300 |
| 2008/0040623 A1 * | 2/2008 | Sone | ............................. | 713/300 |
| 2009/0198931 A1 * | 8/2009 | Ohyama et al. | ............... | 711/162 |
| 2011/0066884 A1 * | 3/2011 | Suzuki | ............................ | 714/14 |

FOREIGN PATENT DOCUMENTS

| | | |
|---|---|---|
| JP | 8-161236 A | 6/1996 |
| JP | 9-330277 A | 12/1997 |
| JP | 2000-112836 A | 4/2000 |
| JP | 2005-165420 A | 6/2005 |
| JP | 2005165420 A | 6/2005 |
| JP | 2006-268419 A | 10/2006 |

(Continued)

OTHER PUBLICATIONS

Japanese Office Action for JP2009-201553 mailed Mar. 4, 2013.

(Continued)

*Primary Examiner* — Raymond Phan

(57) ABSTRACT

An object of the present invention is to improve safety. A disk array apparatus of the present invention includes: CHE and MEM for temporarily storing data which is transmitted/received between a host device and a disk enclosure; CPU, RAIDC, and NVMC for controlling transmission/reception of data; power supply units for supplying power, which is supplied from an external power supply, to disk array control units; batteries for supplying power to the disk array control unit when the power being supplied from the external power supply is shut OFF without executing power supply shut down processing; an insertion/extraction detection unit for detecting insertion/extraction of a connector used for connecting the disk array control unit with the power supply unit; and battery monitors for stopping power supply by the battery when extraction of the connector is detected while the battery is supplying power to each device of the disk array control unit.

6 Claims, 10 Drawing Sheets

(56) References Cited

FOREIGN PATENT DOCUMENTS

| | | |
|---|---|---|
| JP | 2008-278666 A | 11/2008 |
| JP | 2009-25926 A | 2/2009 |
| WO | 9621895 A1 | 7/1996 |
| WO | 01/95335 A1 | 12/2001 |
| WO | 2008142742 A1 | 11/2008 |

OTHER PUBLICATIONS

Japanese Office Action for JP Application No. 2009-201553 mailed on Jul. 8, 2013 with English Translation.

* cited by examiner

DISK ARRAY APPARATUS INCLUDING INSERTION/EXTRACTION DETECTION FUNCTION OF THE CONNECTOR

This application is based upon and claims the benefit of priority from Japanese patent application No. 2009-201553, filed on Sep. 1, 2009, the disclosure of which is incorporated herein in its entirety by reference.

BACKGROUND

The present invention relates to a disk array apparatus.

A disk array apparatus having a plurality of storage devices has a volatile cache memory for increasing the speed of access from the host device. If power being supplied from an external power supply is shut OFF for such a reason as a power failure without executing power supply shut down processing in such a disk array apparatus, unwritten data in the cache memory is lost. To prevent this, a disk array apparatus according to Japanese Patent Application Laid-Open No. H9-330277 and No. 2005-165420, for example, has a battery as a backup power supply. In these disk array apparatuses, if a power failure occurs, power is supplied from the battery to the cache memory, saving the unwritten data in the cache memory to a nonvolatile storage device or the like.

If power supplied from the external power supply is shut OFF for such a reason as a power failure, the control board may be removed from the power supply unit for inspection. In such a case, electric shocks may occur if the power supply from the battery remains active.

SUMMARY

An exemplary object of the invention is to provide a disk array apparatus that can solve the above mentioned problem, and improve safety.

A disk array apparatus according to an exemplary aspect of the present invention includes: a storage unit for storing data which is transmitted from a host device; a volatile storage unit for temporarily storing the data transmitted/received between the host device and the storage unit; a data control unit for controlling transmission/reception of the data; a power supply unit for supplying power, which is supplied from an external power supply, to the volatile storage unit and the data control unit; a battery unit for supplying power to the data control unit and the volatile storage unit when power being supplied from the external power supply is shut OFF without executing power supply shut down processing; an insertion/extraction detection unit for detecting insertion/extraction of a connector used for connecting the data control unit and the volatile storage unit with the power supply unit; and a discharge stopping unit for stopping power supply by the battery unit when extraction of the connector is detected by the insertion/extraction detection unit while the battery unit is supplying power to the data control unit and the volatile storage unit.

A method according to an exemplary aspect of the present invention is a method executed by a disk array apparatus having: a storage unit for storing data which is transmitted from a host device; a volatile storage unit for temporarily storing the data transmitted/received between the host device and the storage unit; a data control unit for controlling transmission/reception of the data; a power supply unit for supplying power, which is supplied from an external power supply, to the volatile storage unit and the data control unit; and a battery unit capable of supplying power to the data control unit and the volatile storage unit, comprising the steps of: starting power supply by the battery unit to the data control unit and the volatile storage unit when the power being supplied from the external power supply is shut OFF without executing power supply shut down processing; detecting insertion/extraction of a connector used for connecting the data control unit and the volatile storage unit with the power supply unit while the battery unit is supplying power to the data control unit and the volatile storage unit by the battery unit; and stopping power supply by the battery unit when extraction of the connector is detected.

A program of the present invention causes a computer to execute each step included in the above mentioned method.

EXEMPLARY EMBODIMENT

Preferred embodiments of a disk array apparatus according to the present invention will now be described with reference to the accompanying drawings.

Figure 1:
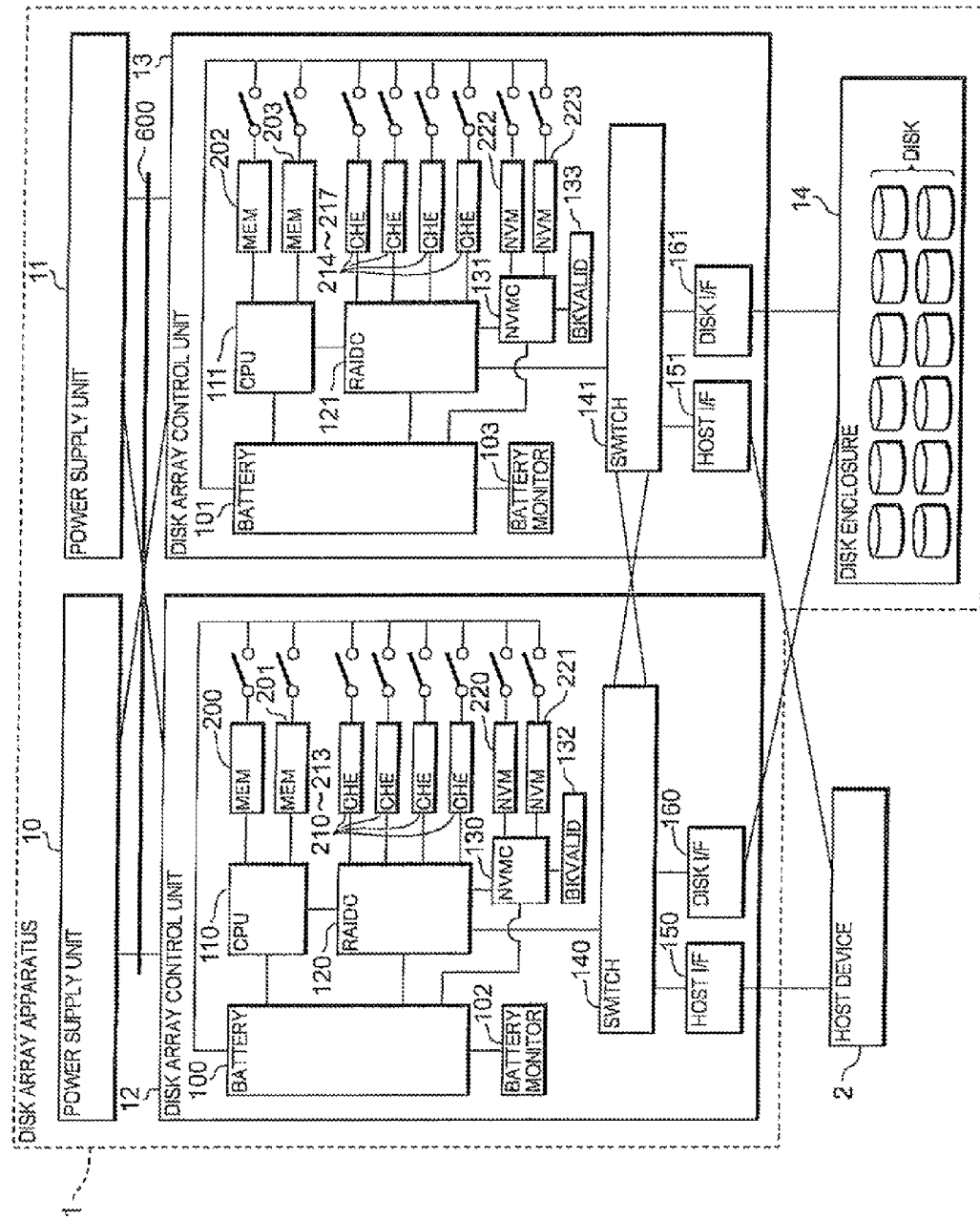
FIG. 1 is a block diagram depicting a configuration of a disk array device according to an embodiment.

First a configuration of the disk array apparatus according to an embodiment will be described with reference to FIG. 1. FIG. 1 is a block diagram depicting a general configuration of the disk array apparatus.

As FIG. 1 shows, the disk array apparatus 1 has power supply units 10 and 11, disk array control units 12 and 13, and a disk enclosure 14.

The power supply units 10 and 11 convert the AC power supplied from an external power supply, such as an outlet, into DC power, and supplies it to the disk array control units 12 and 13. The power supply units 10 and 11 and the disk array control units 12 and 13 can be interconnected via a backboard 600. The power supply units 10 and 11 and the disk array control units 12 and 13 are detachable from the backboard 600 by inserting/extracting the connector.

The disk enclosure 14 has a plurality of hard disks (storage unit, hereafter called disk).

The disk array control unit 12 and the disk array control unit 13 have identification configurations. Therefore in the following description, each component of the disk array control unit 12 is described, and description on each component of the disk array control unit 13 is omitted.

The disk array control unit 12 has a battery 100 (battery unit), a battery monitor 102 (discharge stopping unit), a CPU (Central Processing Unit) 110 (data control unit, data save control unit, power supply control unit and clock supply control unit), a RAID (Redundant Arrays of Inexpensive Disks) controller (data control unit, hereafter called RAIDC (Redundant Arrays of Inexpensive Disks Controller)) 120, a nonvolatile memory controller (data control unit, hereafter called NVMC (Non Volatile Memory Controller)) 130, a switch 140, a host interface (hereafter called host I/F (Interface)) 150, and a disk interface (hereafter called disk I/F) 160. RAID refers to a technology to operate a plurality of hard disks which are combined as one virtual hard disk.

The disk array control unit 12 also has local memories (volatile storage units, hereafter called MEM (Memory)) 200 and 201, cache memories (volatile storage units, hereafter called CHE (Cache)) 210 to 213, nonvolatile memories (nonvolatile storage units, hereafter called NVM (Non Volatile Memory)) 220 and 221, and a BKVALID (Backup Valid) 132.

The battery 100 is a second battery which supplies power required for operating the CPU 110, RAIDC 120, NVMC 130, MEM 200, 201, CHE 210 to 213, NVM 220, 221 and BKVAKID 132 when the power supply being supplied from the external power supply is shut OFF without executing the power supply shut down processing. Examples of the case when the power being supplied from the external power supply is shut OFF without executing the power supply shut down processing are a power failure, and extraction of the power cord in error.

The battery monitor 102 controls the charge/discharge of the battery 100. The battery monitor 102 monitors the residual capacity of the battery 100. The battery monitor 102 may be designed to be detachable from the disk array control unit 12, or may be designed to be attachable to outside the disk array control unit 12. Thereby the battery 100 can be easily replaced when performance of the battery 100 deteriorates.

The CPU 110 is a processor for managing each device of the disk array control unit 12. MEMs 200 and 201 are connected to the CPU 110. The CPU 110 is operated by executing software codes stored in ROM (Read Only Memory, which is not illustrated) for storing firmware or the like. The number of MEMs is not limited to two, but may be one or three or more.

Software codes of an operating system (hereafter called OS (Operating System)), required for operation of the CPU 110, for example, are stored in the MEMs 200 and 201. The MEMs 200 and 201 are also used for temporarily caching data written or read by a host computer (hereafter called host device) 2. A volatile memory that is faster than the disk of the disk enclosure 14, such as a DRAM, can be used for the MEMs 200 and 201. It is preferable to use a memory having such a power saving state as a self refresh mode, such as an SDRAM (Synchronous Dynamic Random Access Memory) conforming to JEDEC (Joint Electron Device Engineering Council) specifications, for example.

The RAIDC 120 is an LSI (Large Scale Integration) for implementing the functions of a RAID. The CHEs 210 to 213 are connected to the RAIDC 120. The number of CHEs is not limited to four, but may be less than 4, or may be five or more. The functions of the CHE may be integrated into the MEM.

The RAIDC 120 can control the ON/OFF of the power saving mode and change the setting of the clock frequency for each of the CHEs 210 to 213. An example of the power saving mode is self refresh mode in a DRAM (Dynamic Random Access Memory).

The RAIDC 120 has a parity calculation function which is required for RAID, and a function to write the same data simultaneously to two disks (hereafter called dual write). The RAIDC 120 also has a function to insure, by the switch 140, that the cache data in the CHEs 210 to 213 and the MEMs 200 and 201 in the disk array control unit 12 is identical to the cache data in the CHEs 214 to 217 and the MEMs 202 and 203 in the disk array control unit 13. Furthermore, the RAIDC 120 has a function to have the CPU 110 of the disk array control unit 12 obtain each device state in the disk array control unit 13. Examples of each device state are power supply ON/OFF state, hardware reset cancellation state, operation state of the CPU 111, and operation state of the RAIDC 121.

The functions of the RAIDC 120 can also be implemented by software executed by the CPU 110. In this case, the functions of the CHEs 210 to 213 can be integrated into the MEMs 200 and 201.

The CHEs 210 to 213 are used for temporarily caching the data written/read by the host device 2. The CHEs 210 to 213 can also be used as the work area of the RAIDC 120. For the CHEs 210 to 213, a volatile memory that is faster than the disk of the disk enclosure 14, such as a DRAM, can be used. It is preferable to use a memory having such a power saving state as the self refresh mode, an SDRAM conforming to JEDEC specifications, for example.

The NVMC 130 reads/writes data from/to the NVMs 220 and 221, and sets/resets data in the BKVALID 132. The NVMC 130 encloses a DMA (Direct Memory Access) controller. The NVMC 130 reads data from the CHEs 210 to 213 and MEMs 200 and 201 according to instructions from the CPU 110, and writes data from/to the NVMs 220 and 221. The NVMC 130 has a timer function which is arbitrarily set by the CPU 110.

The NVMC 130 obtains residual capacity information on the battery from the battery monitor 102. The NVMC 130 has a function to detect whether the residual capacity of the battery 100 is less than a predetermined lower limit capacity. The lower limit capacity is, for example, a lower limit value of the capacity required for executing data save processing using the battery 100. An example of the data save processing is a processing to copy the data held in the CHEs 210 to 213 and MEMs 200 and 201 to the NVMs 220 and 221.

The function of the NVMC 130 may be integrated into the RAIDC 120. In this case, the NVMs 220 and 221 are simply connected to the RAIDC 120. The function of the NVMC 130 may be integrated into the CPU 110. In this case, the NVMs 220 and 221 are simply connected to the CPU 110.

The NVMs 220 and 221 are nonvolatile memories for saving data held in the CHEs 210 to 213 and MEMs 200 and 201 when the power being supplied from the external power supply is shut OFF without executing the power supply shut down processing. The NVMs 220 and 221 have a save completion flag, respectively. The save completion flag is a flag to indicate whether all the data held in the CHEs 210 to 213 and MEMs 200 and 201 are saved in the NVMs 220 and 221. Therefore if the save completion flag is ON, it means that all the data held in the CHEs 210 to 213 and MEMs 200 and 201 is saved. The number of NVMs is not limited to two, but may be less than two, or may be three or more.

For the NVMs 220 and 221, a nonvolatile memory which is slower than the CHEs 210 to 213 and MEMs 200 and 201, such as a NAND type flash memory, can be used. A compact HDD (Hard Disk Drive) or SSD (Solid State Drive) may be used instead. Also a nonvolatile memory enclosing a controller, such as an SD memory card and Compact Flash® may be used instead.

Since some nonvolatile memories have a limit in the number of rewritable times and have a high failure frequency, it is preferable that the NVMs 220 and 221 be detachable from the disk array control unit 12 and replaced. It is also preferable that the NVMs 220 and 221 be replaceable even if the disk array apparatus 1 is in operation. Before the NVM 220 or 221 is replaced, the power supply to the replacement target NVM should be turned OFF.

The BKVALID 132 is a memory for storing data which indicates whether the battery 200 is in backup processing enable state. For the BKVALID 132, a 1-bit flip-flop, for example, can be used. The BKVALID 132 may be a volatile memory. To use the 1-bit flip-flop as the BKVALID 132, data "1" is set if the battery 200 is in backup processing enable state, and data is cleared and reset to "0" if the battery 200 is in backup processing disable state. Whether the battery 200 is in backup processing enable state or not can be determined based on whether the residual capacity of the battery is in a capacity or more to execute backup processing. The backup processing includes processing for supplying power to each device of the disk array control unit 12, instead of the external power supply, and the above mentioned data save processing.

In concrete terms, if the power of the battery 100 becomes insufficient while saving data by the backup processing using the battery 100, the data in the BKVALID 132 is cleared and reset to "0". Then when the disk array apparatus 1 is started up and the battery 100 is recharged to the backup processing enable state, "1" is set as the data on the BKVALID 132. Set/reset of the data in the BKVALID 132 is controlled by the CPU 110 via the NVMC 130, for example.

The switch 140 is connected with the RAIDC 120, host I/F 150, disk I/F 160 and switch 141 in the disk array control unit 13 side respectively, and has a switching function of a bus that interconnects these components.

The CPU 110 shown in FIG. 1 is not connected to the switch 140, however the CPU 110 may be directly connected to the switch 140. The functions of the switch 140 may be integrated into the CPU 110 or the RAIDC 120. In this case, the host I/F 150 and disk I/F 16 are directly connected to the CPU 110 or the RAIDC 120.

The host I/F 150 is an interface that is connected with the host device 2. For the host I/F 150, Fibre Channel, iSCSI (internet Small Computer System Interface) or Infiniband, for example, can be used. A number of the host devices connected to the host I/F 150 may be two or more.

The disk I/F 160 is an interface that is connected with the disk enclosure 14. For the disk I/F 160, SAS (Serial Attached SCSI), SATA (Serial Advanced Technology Attachment), SCSI (Small Computer System Interface), or Fibre Channel, for example, can be used. A number of disk enclosures connected to the disk I/F 160 may be two or more.

Now the power supply mechanism in the disk array control unit will be described with reference to FIG. 2. As mentioned above, the configuration of the disk array control unit 12 is the same as the configuration of the disk array control unit 13, so the power supply mechanism of the disk array control unit 12 is described here, and description on the power supply mechanism of the disk array control unit 13 is omitted.

Figure 2:
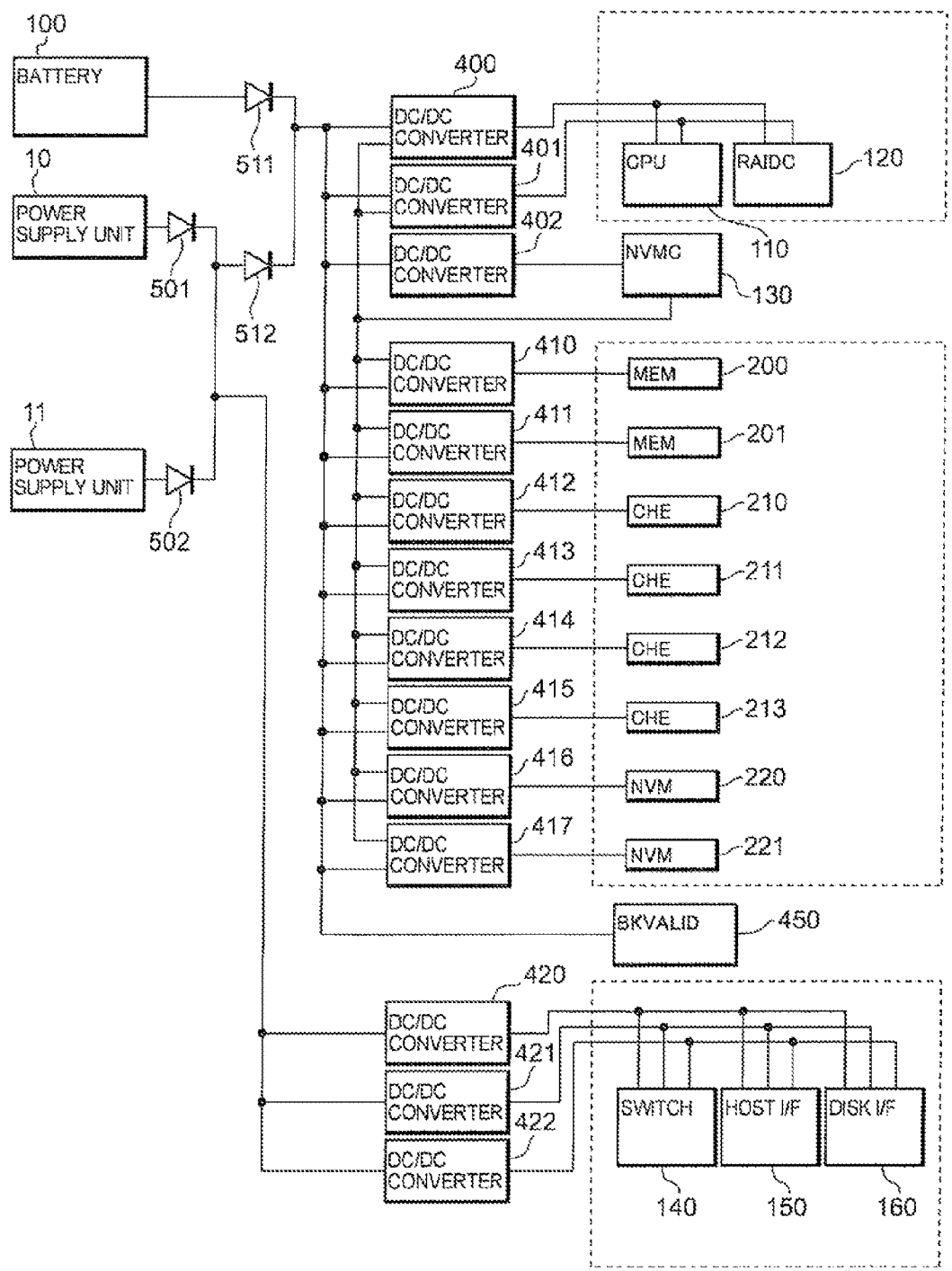
FIG. 2 is a diagram depicting a power supply mechanism of the disk array control unit shown in FIG. 1.

As FIG. 2 shows, the power supply unit 10 and the power supply unit 11 are OR-connected to a part of the disk array control unit 12 by diodes 501 and 502. Thereby even if one of the power supply units fails, power supply to the disk array control unit 12 can be continued. A number of the power supply units is not limited to two, but may be three or more.

The power supply units 10 and 11 and the battery 100 are OR-connected to a part of the disk array control unit 12 via the diodes 511 and 512. Therefore even if power cannot be supplied from the power units 10 and 11 due to a power failure, power can be supplied from the battery 100 to the disk array control unit 12. The diodes are used for each of the OR-connections mentioned above, but the present invention is not limited to this. A selector, for example, may be used so that a power supply which failed is switched to another power supply.

DC/DC converters 400 to 422 are power supply circuits which steps up or steps down the DC voltage that is input.

The DC/DC converters 400 and 401 output power required for operation of the CPU 110 and the RAIDC 120 respectively based on the DC voltage which was output from one power supply out of the power supply units 10, 11 and the battery 100. A number of DC/DC converters 400 and 401 is not limited to two, but may be increased or decreased according to necessity. The DC/DC converters 400 and 401 can independently switch ON/OFF of the output according to the instruction from the NVMC 130.

The DC/DC converter 402 outputs power required for the operation of the NVMC 130 based on the DC voltage that is output from one power supply out of the power supply units 10, 11 and the battery 100.

The DC/DC converters 410 to 417 output power required for operation of the MEMs 200, 201, CHEs 210 to 213 and NVMs 220 and 221 respectively, based on the DC voltage that is output from one power supply out of the power supply units 10, 11 and the battery 100. The DC/DC converters 410 to 417 can independently switch ON/OFF of the output according to the instruction from the NVMC 130.

The DC/DC converters 420 to 422 output power required for operation of the switch 140, host I/F 150 and disk I/F 160 respectively based on the DC voltage that is output from one power supply out of the power supply unit 10 and power supply unit 11. A number of DC/DC converters 420 to 422 is not limited to three, but may be increased or decreased according to necessity.

Figure 3:
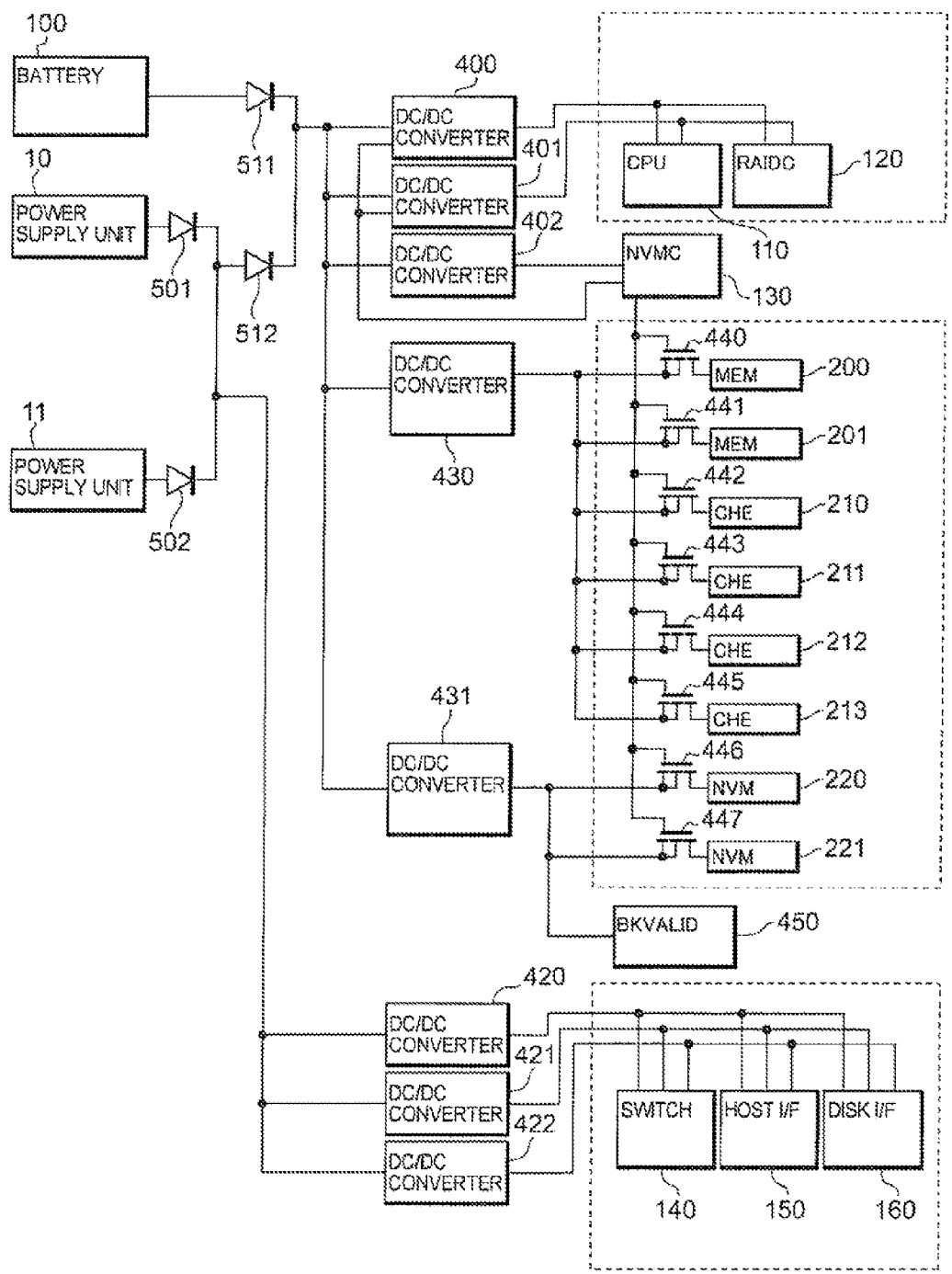
FIG. 3 is a diagram depicting a variant form of the power supply mechanism shown in FIG. 2.

The ON/OFF control of the output by the DC/DC converters 410 to 417 can be replaced with the ON/OFF control by the FET (Field Effect Transistor) gates 440 to 447 shown in FIG. 3. In this case, a number of DC/DC converters can be two converters, that is the DC/DC converter 430 and the DC/DC converter 431, so functions equivalent to FIG. 2 can be implemented simply and inexpensively. In this case, the voltages of the DC/DC converters 430 and 431 must be set considering the voltage drop generated by passing through the FET gates 440 to 447.

Now a battery power supply stopping function in the disk array control unit 12 will be described with reference to FIG. 4. As mentioned above, the configuration of the disk array control unit 12 is the same as the configuration of the disk array control unit 13, so the battery power supply stopping function in the disk array control unit 12 is described, and description on the battery power supply stopping function in the disk array control unit 13 is omitted.

Figure 4:
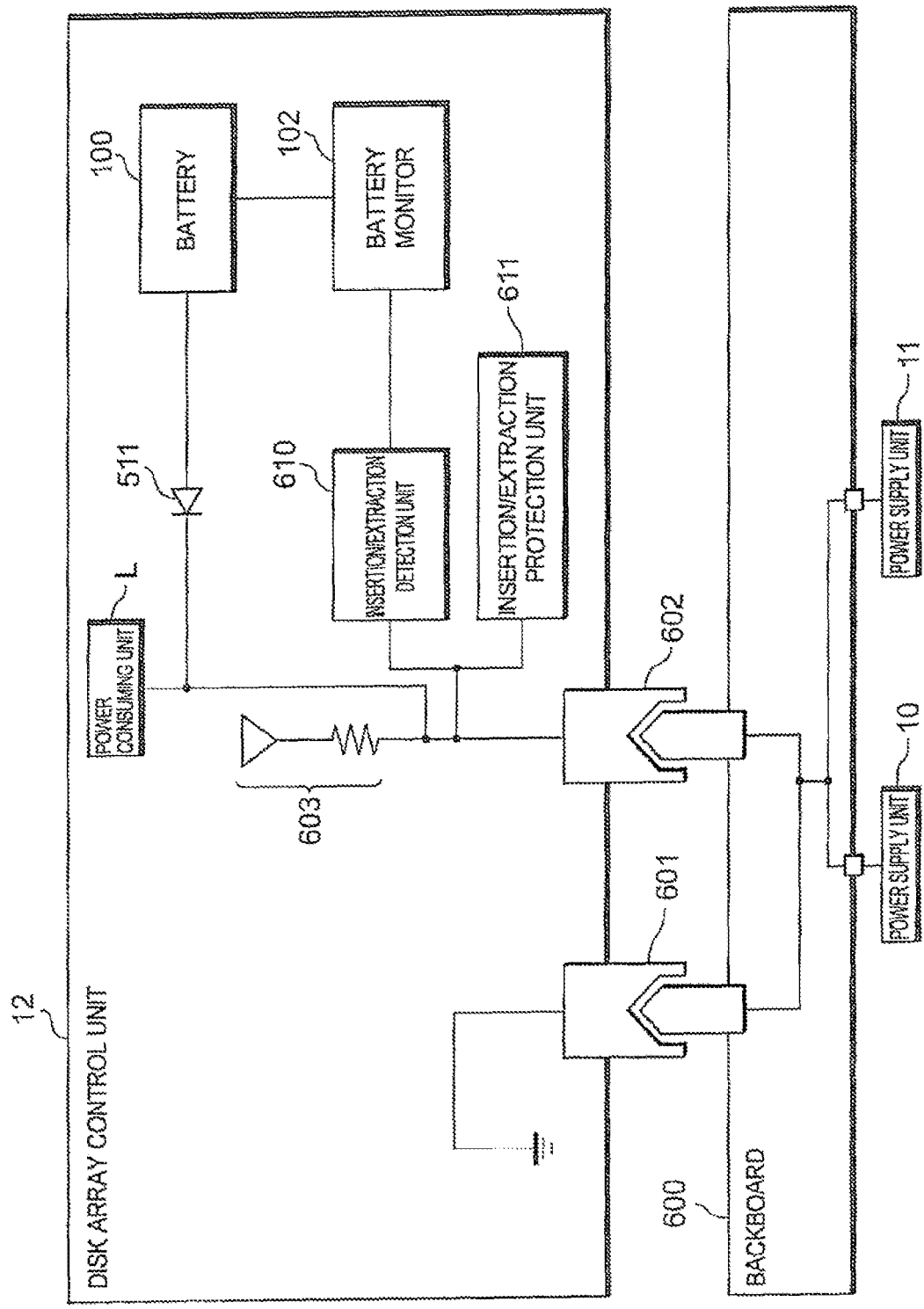
FIG. 4 is a diagram depicting a configuration to implement the power supply stop function of the battery in the disk array control unit shown in FIG. 1.

As FIG. 4 shows, the disk array control unit 12 also has an insertion/extraction detection unit 610 and an insertion/extraction protection unit 611. The disk array control unit 12 can be attached to/detached from the backboard 600 by inserting/extracting the connectors 601 and 602. The power supply units 10 and 11 are connected to the backboard 600. A power consumption unit L shown in FIG. 4 includes a CPU 110, RAIDC 120, NVMC 130, MEMs 200 and 201, CHEs 210 to 213, NVMs 220 and 221 and BKVAKID 132.

If the disk array control unit 12 is attached to the backboard 600, the connectors 601 and 602 are conducted, and a Low level potential signal is sent to the insertion/extraction detection unit 610 and the insertion/extraction protection unit 611. If the disk array control unit 12 is detached from the backboard 600, the High level potential signal is sent to the insertion/extraction detection unit 610 and the insertion/extraction protection unit 611 by the pull-up resister 603.

The insertion/extraction detection unit 610 monitors the insertion/extraction state of the connectors 601 and 602 based on the potential signal. The insertion/extraction detection unit 610 notifies the state to the battery monitor 102 when the connectors 601 and 602 are extracted. In concrete terms, when a High level potential signal is received, the insertion/extraction detection unit 610 notifies a signal, which indicates extraction of the connectors 601 and 602, to the battery monitor 102.

When a signal, which indicates extraction of the connectors 601 and 602, is received, the battery monitor 102 stops power supply from the battery 100. In other words, discharge of the battery 100 is stopped.

Thereby if the disk array control unit 12 is disconnected during a backup processing using the battery 100, discharge of the battery 100 can be stopped. Therefore danger of continuation of the power ON state by the battery 100, even after the disk array control unit 12 is disconnected, can be prevented. In other words, electric shocks via the connectors 601 and 602 can be prevented, so safety can be improved.

The insertion/extraction protection unit 611 has a function to relax the sudden change of power supplied from the power supply unit 10 when the disk array control unit 12 is attached to/detached from the backboard 600. Therefore each device in the disk array control unit 12 can be protected from over voltage.

The lighting function upon using the battery will now be described with reference to FIG. 5. As mentioned above, the configuration of the disk array control unit 12 is the same as the configuration of the disk array control unit 13, so the lighting function upon using the battery of the disk array control unit 12 is described here, and the description on the lighting function upon using the battery of the disk array control unit 13 is omitted.

Figure 5:
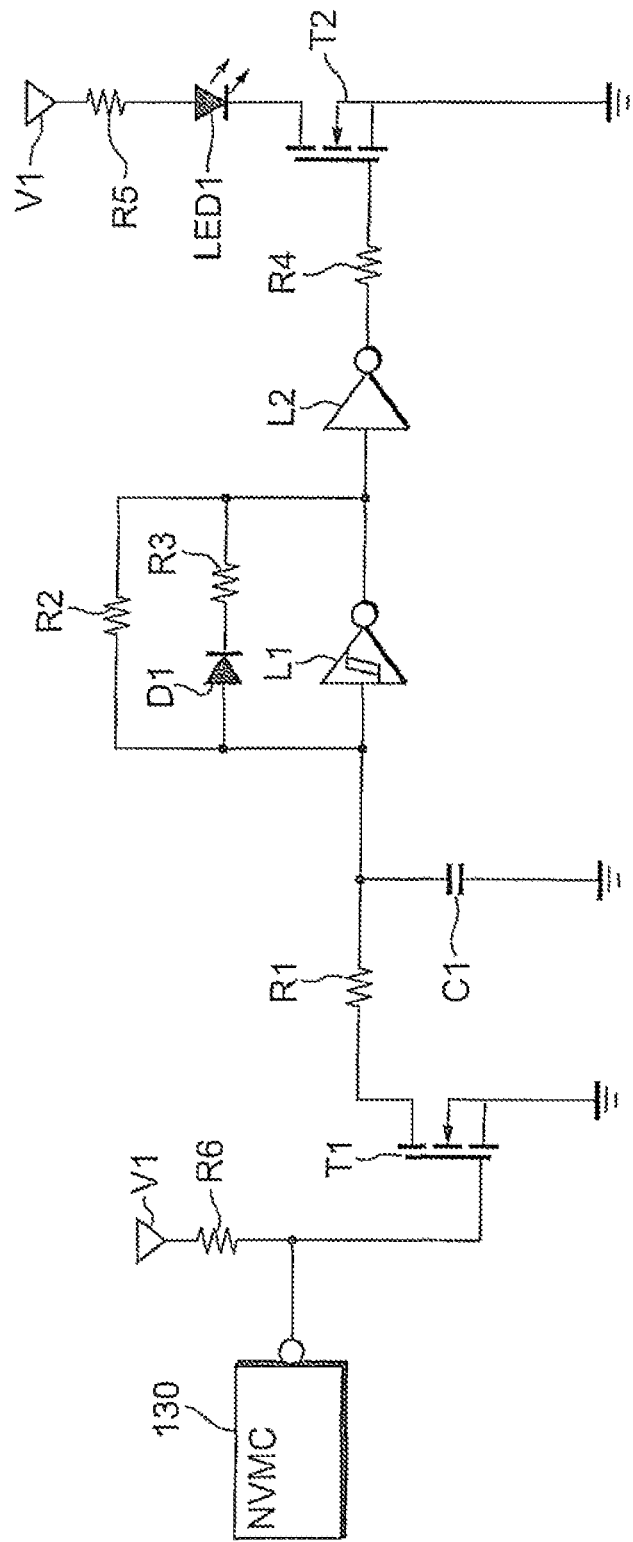
FIG. 5 is a diagram depicting a configuration to implement the lighting function when the battery is used in the disk array control unit shown in FIG. 1.

A light emitting diode LED1 shown in FIG. 5 turns ON when the battery 100 is supplying power, and turns OFF when the battery 100 is not supplying power. Thereby the state of power being supplied by the battery 100 can be visually notified to the outside. As a result, extraction of the disk array control unit 12 from the backboard 600 while the cache data is being backed up by the battery 100, can be prevented. In other words, safety can be further improved.

A field effect transistor (FET) T1 shown in FIG. 5 is disposed so that a control signal from the NVMC 130 does not affect the operation of the capacitor C1. Resistors R1, R3, R4 and R5 are disposed for limiting current that flows through the circuit. A Schmidt trigger NOT gate L1, diode D1, resistor for setting a time constant R2, and a capacitor for setting a time constant C1 constitute an oscillation circuit. The Schmidt trigger NOT gate L2 is a NOT gate for driving a field effect transistor T2. The power supply V1 is a power supply for lighting the light emitting diode LED1. For the power supply V1, a power supply identical with the power supply for operating the NVMC 130 can be used. The field effect transistor T2 is a switching FET for turning the light emitting diode LED1 ON/OFF. For the power supply to drive the gates of the Schmidt trigger NOT gates L1 and L2, the power supply V1 can be used. The power supply V1 and the resistor R5 constitute the pull-up resistor. In the same manner, the power supply V1 and the resistor R6 constitute the pull-up resistor.

A mechanism of the light emitting diode turning OFF when the battery 100 is stopping the power supply will be described with reference to FIG. 5. When the battery 100 enters the power supply stopping state, the output of the NVMC 130 becomes High level. This turns the field effect transistor T1 ON, and charges of the capacitor C1 are discharged. By this, the output of the Schmidt trigger NOT gate L1 becomes High level, and the output of the Schmidt trigger NOT gate L2 becomes Low level. This turns the field effect transistor T2 OFF, and turns the light emitting diode LED1 OFF.

A mechanism of the light emitting diode blinking when the battery is supplying power will be described with reference to FIG. 5. When the battery 100 enters the power supply state, the output of the NVMC 130 becomes Low level. This turns the field effect transistor T1 OFF, and oscillation is generated in the oscillation circuit while maintaining the output of the Schmidt trigger NOT gate L1 in the High level. Thereby the charges that flow via the resistor R2 of the oscillation circuit are stored in the capacitor C1. When the voltage of the capacitor C1 exceeds the turn ON voltage of the Schmidt trigger NOT gate L1, the output of the Schmidt trigger NOT gate L1 becomes Low level. By this, the output of the Schmidt trigger NOT gate L2 becomes High level, and the field effect transistor T2 turns ON, so as a result, the light emitting diode LED1 turns ON.

Then the charges in the capacitor C1 are discharged via the diode D1. When the charges in the capacitor C1 become less than the turn OFF voltage of the Schmidt trigger NOT gate L1, the output of the Schmidt trigger NOT gate L1 becomes High level. Thereby the output of the Schmidt trigger NOT gate L2 becomes Low level and the field effect transistor T2 turns OFF, so as a result, the light emitting diode LED1 turns OFF.

Because of this, the light emitting diode can blink at a predetermined cycle when the battery 100 becomes power supply state.

The blinking cycle can be adjusted by changing the capacity of the capacitor C1 and the resistance value of the resistor R2. It is preferable that the blinking cycle is about 1 to 2 seconds, for example. It is also preferable that the duty ratio of the ON time and OFF time of the light emitting diode is set in a range where visibility is not diminished. For example, about 1:1000 is preferable. This duty ratio can be adjusted by changing the resistance values of the resistor R3 and the resistor R2. If the diode D1, of which temperature-based change of reverse current is small, is used, the influence on the duty ratio and the blinking cycle can be decreased. In concrete terms, using a silicon diode is preferable. On the other hand, an example of a diode, of which temperature-based change of reverse current is large, is a Schottky barrier diode.

By blinking the light emitting diode like this, current can be decreased to about 1/1000 compared with the case of continuously lighting the light emitting diode. In other words, by blinking the light emitting diode when the power of the battery 100 is being supplied to the disk array control unit 12, the battery ON state can be recognized from the outside using minimal current.

Various operations of the disk array apparatus 1 according to the present invention will be described with reference to the drawings. As mentioned above, the configuration of the disk array control unit 12 is the same as the configuration of the disk array control unit 13, so the operation of the disk array control unit 12, out of the operations of the disk array apparatus 1, is described, and description on the operation of the disk array control unit 13 is omitted.

Figure 6:
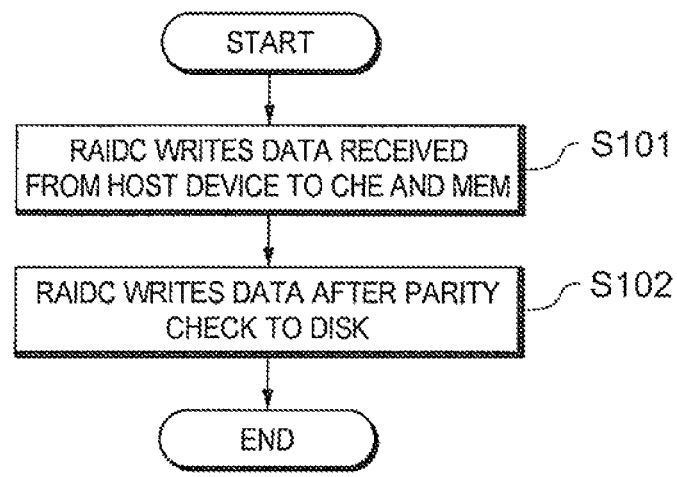
FIG. 6 is a flow chart depicting an operation when data received from the host device is stored on the disk.

The operation for storing the data received from the host device to the disk will be described first, with reference to FIG. 6.

First the RAIDC 120 writes the data, which was received from the host device 2 via the host I/F 150, to the CHEs 210 to 213 or MEMs 200 and 201 (step S101).

Then the RAIDC 120 executes parity calculation required for a RAID. Then the RAIDC 120 writes the data of which parity check is completed to the disk of the disk enclosure 14 via the disk I/F 160 (step S102).

Figure 7:
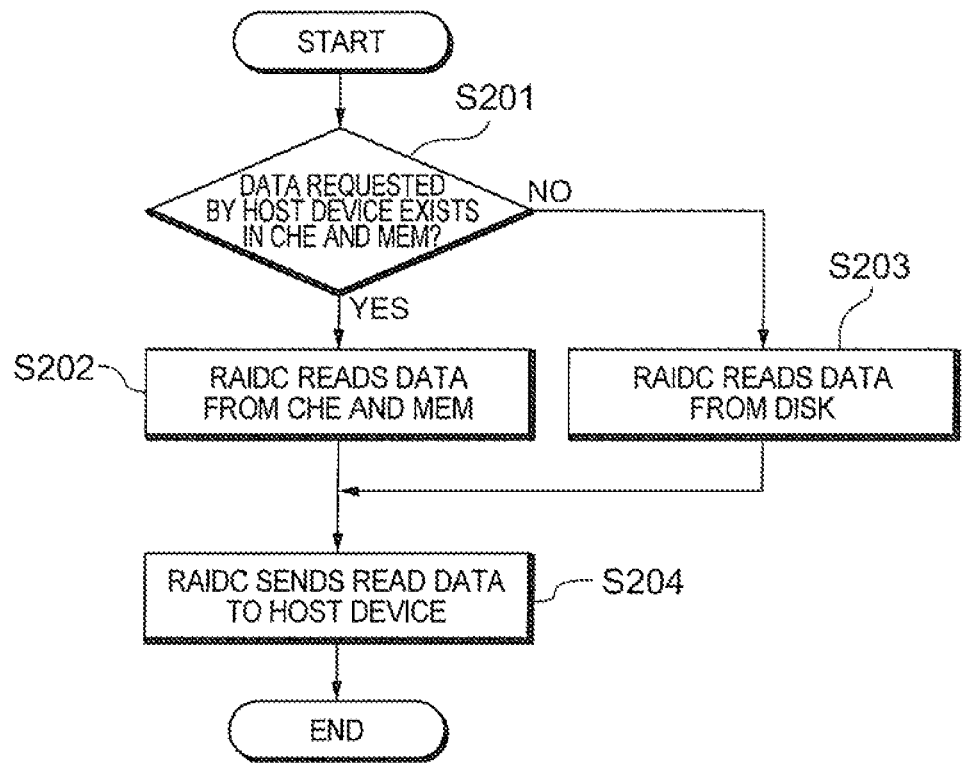
FIG. 7 is a flow chart depicting an operation when data requested by the host device is transmitted to the host device.

Now the operation when the data requested from the host device is sent to the host device will be described with reference to FIG. 7.

First the RAIDC 120 determines whether the data requested by the host device 2 is cached in the CHEs 210 to 213 or MEMs 200 and 201 (step S201). If this determination is YES (step S201: YES), the RAIDC 120 reads data from the CHEs 210 to 213 or MEMs 200 and 201 (step S202).

On the other hand, if it is determined that the data requested by the host device 2 is not cached in the CHEs 210 to 213 or MEMs 200 and 201 in the determination in step S201 (step S201: NO), the RAIDC 120 reads data from the disk of the disk enclosure 14 via the disk I/F 160 (step S203).

Then the RAIDC 120 sends the read data to the host device 2 via the host I/F 150 (step S204).

Figure 8:
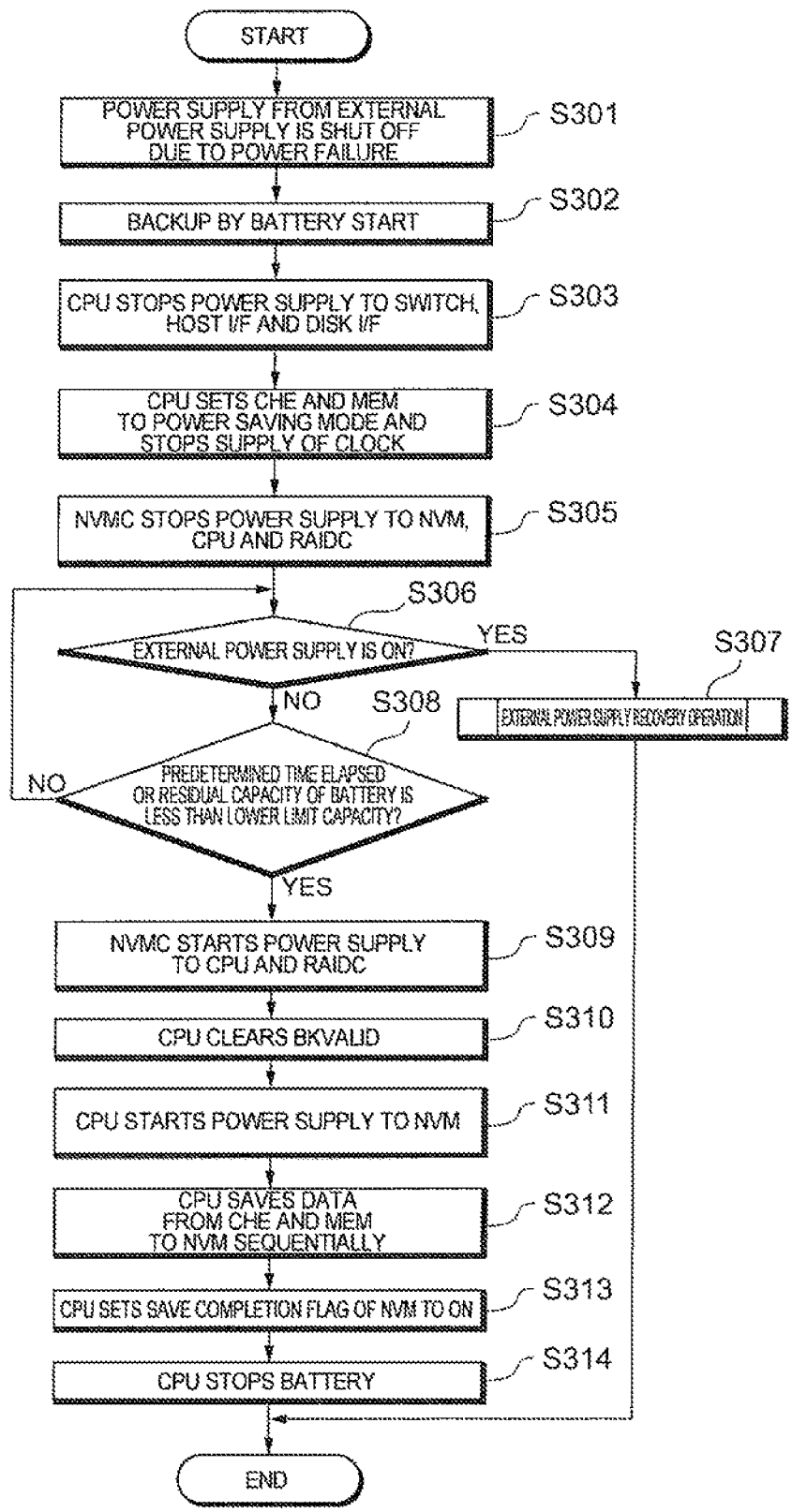
FIG. 8 is a flow chart depicting an operation of the disk array control unit when power being supplied from the external power supply is shut OFF.

Now the operation of the disk array control unit when power being supplied from the external power supply is shut OFF will be described with reference to FIG. 8.

When the power being supplied from the external power supply is shut OFF without executing the power supply shut down processing, due to a power failure, for example (step S301), the CPU 110 starts backup processing by the battery 100 (step S302).

The CPU 110 turns OFF the DC/DC converters 420 to 422, which are not connected to the battery 100 so as to stop power supply to the switch 140, host I/F 150 and disk I/F 160 (step S303). In parallel with this, the CPU 110 switches the CHEs 210 to 213 and MEMs 200 and 201 to power saving mode (e.g. self refresh mode), and stops clock supply to the CHEs 210 to 213 and MEMs 200 and 201 (step S304). Instead of stopping the clock supply, the frequency of the clock to be supplied may be decreased to a frequency close to the lower limit frequency according to the standard. After switching the MEMs 200 and 201 to power save mode, the CPU 110 can no longer refer to the software code stored in the MEMs 200 and 201. Therefore the CPU 110 refers to the software codes stored in ROM for storing firmware or the like, and executes subsequent processing.

Then the NVMC 130 turns OFF the DC/DC converters 416 and 417 to stop power supply to the NVMs 220 and 221, and turns OFF the DC/DC converters 400 and 401 to stop power supply to the CPU 110 and RAIDC 120 (step S305). As a result, the content of the CHEs 210 to 213 and the content of the MEMs 200 and 201 can be held in a minimum power consumption state.

Then the NVMC 130 determines whether external power supply is turned ON (step S306). If this determination is YES (step S306: YES), the later mentioned operation upon recovering the eternal power supply is executed (step S307).

If it is determined that the external power supply is not turned ON in step S306 (step S306: NO), on the other hand, the NVMC 130 determines whether a predetermined time, set by the timer in advance, has elapsed or not, or whether the residual capacity of the battery became less than the lower limit capacity (step S308). If this determination is NO, processing moves to the above mentioned step S306.

If it is determined that the predetermined time has elapsed or the residual capacity of the battery became less than the lower limit capacity in step S308, on the other hand (step S308: YES), the NVMC 130 turns ON the DC/DC converters 400 and 401, and starts supplying power to the CPU 110 and RAIDC 120 (step S309).

Then the CPU 110 clears the data of the BKVALID 132 via the NVMC 130 (step S310).

Then the CPU 110 turns ON the DC/DC converters 416 and 417 and starts supplying power to the NVMs 220 and 221 (step S311).

Then the CPU 110 starts up the DMA controller of the NVMC 130, and copies the data held in the CHEs 210 to 213 and MEMs 200 and 201 sequentially to the NVMs 220 and 221, in order to save the data (step S312).

Then when all the data held in the CHEs 210 to 213 and MEMs 200 and 201 is saved, the CPU 110 sets the save completion flags in the NVMs 220 and 221 to ON (step S313). Because of this, when the save completion flag is ON, it is known that a valid cache data that is not written to the disk is held in the NVMs 220 and 221.

Then the CPU 110 stops the battery 100 (step S314). Thereby the disk array apparatus 1 stops.

The data save processing in step S312 is performed as follows, for example. The CPU 110 specifies a number of CHEs and MEMs that can be operated in a range not exceeding the maximum write speed to the NVMs 220 and 221. The CPU 110 cancels the power saving mode of the specified CHEs and MEMs. The CPU 110 supplies a clock signal, in which frequency is dropped to a level to obtain the minimum transfer speed to be required, to the CHEs and MEMs for which the power save mode was cancelled. The CPU 110 starts saving the data held in the specified CHEs and MEMs. When saving of the data ends, the CPU 110 sets the specified CHEs and MEMs to power saving mode, and stops supplying the clock signal. The CPU 110 specifies the CHEs and MEMs to save data next, and cancels power saving mode, supplies the clock signal, then saves data, as mentioned above. This procedure is repeated until all the data held in the CHEs and MEMs are saved.

Since power consumption upon saving the content of the CHEs and MEMs to the NVMs can be decreased by controlling the power and clock signals for a plurality of the CHEs and MEMs independently like this, capacity of the battery can be decreased to make battery size smaller.

The NVMC 130 may turn the DC converters 416 and 417 OFF to stop power supply to the NVMs 220 and 221, and turn the DC/DC converters 400 and 401 OFF as well to stop power supply to the CPU 110 and RAIDC 120 before performing the battery stop processing in step S314.

If the external power supply is turned ON in a period from clearing data of the BKVALID 132 in step S310 to the completion of saving data to the NVMs 220 and 221 in step S312, the later mentioned external power supply recovery processing should be executed after the data save processing is executed to completion.

Figure 9:
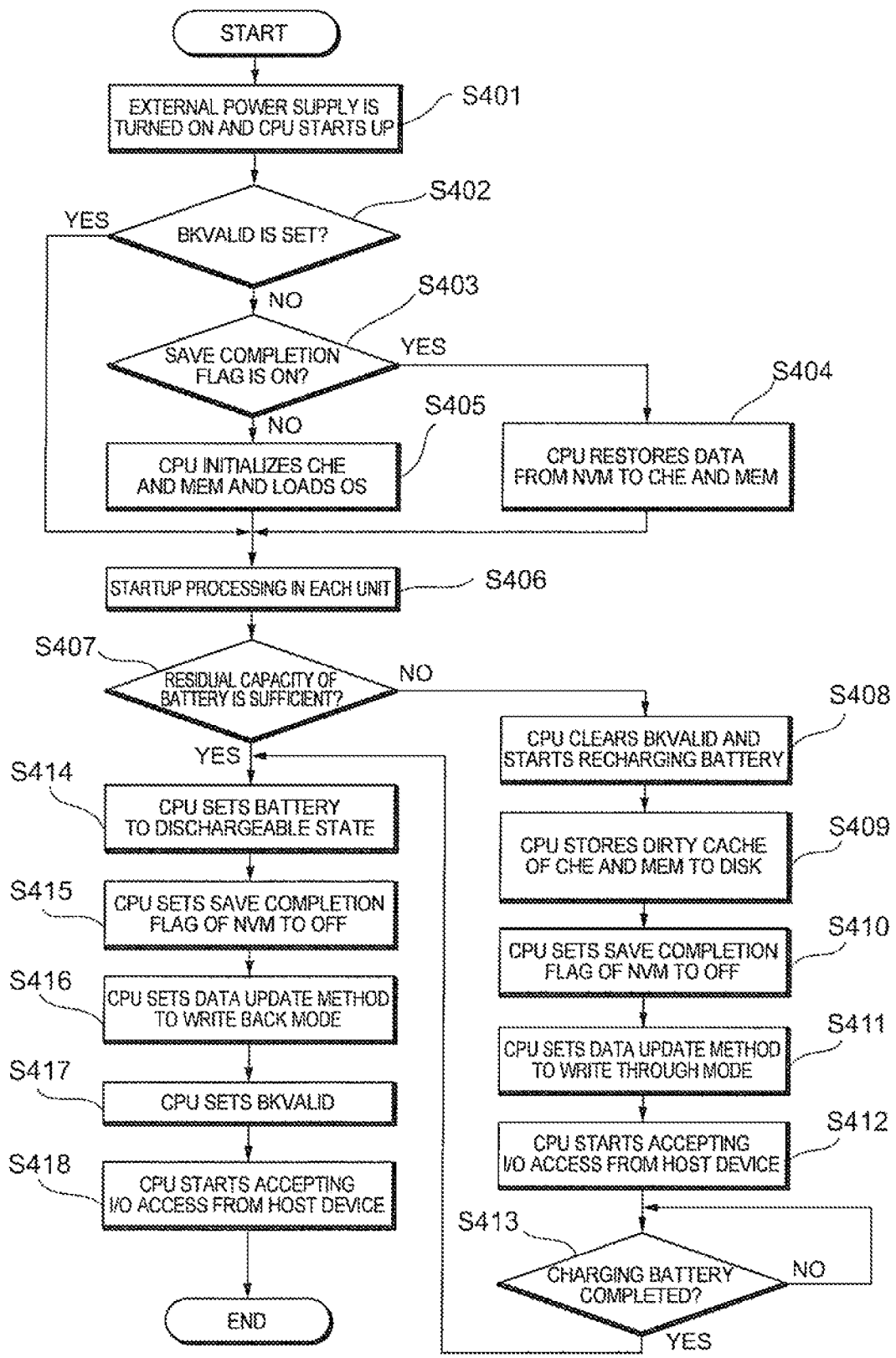
FIG. 9 is a flow chart depicting an operation when the external power supply is recovered.

Now the operation executed when the external power supply is recovered in step S307 will be described with reference to FIG. 9.

When the external power supply is turned ON, the power is supplied to each device in the disk array control unit 12, and the CPU 110 is started up (step S401). At this point, the state of the MEMs 200 and 201 is unknown. Therefore until the MEMs 200 and 201 become available, the CPU 110 refers to the software code stored in ROM for storing firmware to execute the subsequent processing.

Then the CPU 110 determines whether the data in the BKVALID 132 is set (step S402). If the determination is YES (step S402: YES), the CPU 110 determines that the data in the CHEs 210 to 213 and MEMs 200 and 201 have been held by the battery 100, and moves processing to the later mentioned step S406. In this case, all the data in the CHEs 210 to 213 and MEMs 200 and 201 have been held, so boot processing for the OS at startup can be omitted, and therefore startup becomes faster than usual.

If it is determined in step S402 that the data in the BKVALID 132 is not set (step S402: NO), on the other hand, the CPU 110 determines whether the save completion flags of the NVMs 220 and 221 are ON (step S403). If this determination is YES (step S403: YES), the CPU 110 determines that data has been saved in the NVMs 220 and 221, and copies the data held in the NVMs 220 and 221 to the CHEs 210 to 213 and MEMs 200 and 201 to restore the data (step S404). Then processing is moved to the later mentioned step S406.

If it is determined that the save completion flag is OFF in the step S403 (step S403: NO), on the other hand, the CPU 110 initializes the CHEs 210 to 213 and MEMs 200 and 201 as regular startup processing, and loads the OS from ROM for storing firmware, that is connected to the CPU 110 (step S405).

Then the CPU 110 executes startup processing including initialization of the RAIDC 120, switch 140, host I/F 150 and disk I/F 160 (step S406).

Then the CPU 110 determines whether the residual capacity of the battery 100 is sufficient for executing the backup processing (step S407). If this determination is NO (step S407: NO), the CPU 110 clears the data in the BKVALID 132, and starts recharging the battery 100 (step S408). In the case of enabling execution of backup processing by the battery if one of the batteries 100 and 101 has sufficient residual capacity, the residual capacity is determined for the battery 100 and battery 101 respectively when the residual capacity of the battery is determined.

When cache data not written in the disk (hereafter called dirty cache) is stored in the CHEs 210 to 213 and MEMs 200 and 201, the CPU 110 stores the dirty cache on the disk (step S409).

Then the CPU 110 sets the save completion flags of the NVMs 220 and 221 to OFF (step S410).

Then the CPU 110 sets the data update method to write through mode (step S411).

The available data update methods here are the write through mode and the write back mode. In the write through mode, data is cached in the CHEs 210 to 213 and MEMs 200 and 201, and the data is also written on the disk. In the write back mode, data is cached only in the CHEs 210 to 213 and MEMs 200 and 201 upon storing the data, and cached data is written on the disk using the open time of the CPU. In other words, in the write through mode, dirty cache does not exist in the CHEs 210 to 213 and MEMs 200 and 201, while in write back mode, dirty cache exists in the CHEs 210 to 213 and MEMs 200 and 201.

Then the CPU 110 starts accepting the I/O access from the host device 2 (step S412). In write through mode, all the data held in the CHEs 210 to 213 and MEMs 200 and 201 is data written on the disk (hereafter called clean cache). Therefore the dirty cache is never lost even if the power being supplied from the external power supply is shut OFF without executing the power supply shutdown processing.

Then the CPU 110 determines whether recharging the battery 100 started in step S408 is completed (step S412), and stands by if recharging is not completed (step S412: NO), or moves processing to the later mentioned step S414 if recharging is completed (step S412: YES).

If it is determined that the residual capacity of the battery 100 is sufficient in step S407 (step S407: YES), on the other hand, the CPU 110 sets the battery 100 to the dischargeable state (step S414).

Then the CPU 110 sets the save completion flags of the NVMs 220 and 221 to OFF (step S415).

Then the CPU 110 sets the data update method to write back mode (step S416).

Then the CPU 110 sets the data in the BKVALID 132 (step S417), and starts accepting I/O access from the host device 2 (step S418). By setting the data in BKVALID 132, the data held in the CHEs 210 to 213 and MEMs 200 and 201 is backed up by the battery 100, even if power being supplied from the external power supply is shut OFF without executing the power supply shutdown processing.

As a result, even in the case when the power being supplied from the external power supply is shut OFF without executing the power supply shutdown processing, the data in CHEs and MEMs held by battery power can be directly used to restart the operation of the disk array apparatus if the external power supply is turned ON before a predetermined time elapses, or while the residual capacity of the battery is sufficient. In this case, data is not saved in an NVM, therefore the life of the nonvolatile memory, to which the number of times of writing is limited, can be extended.

If external power supply is not turned ON before the predetermined time elapses or while the residual capacity of the battery is sufficient, on the other hand, the data in CHEs and MEMs can be saved to an NVM, which is a nonvolatile memory, so the loss of the dirty cache can be prevented.

Figure 10:
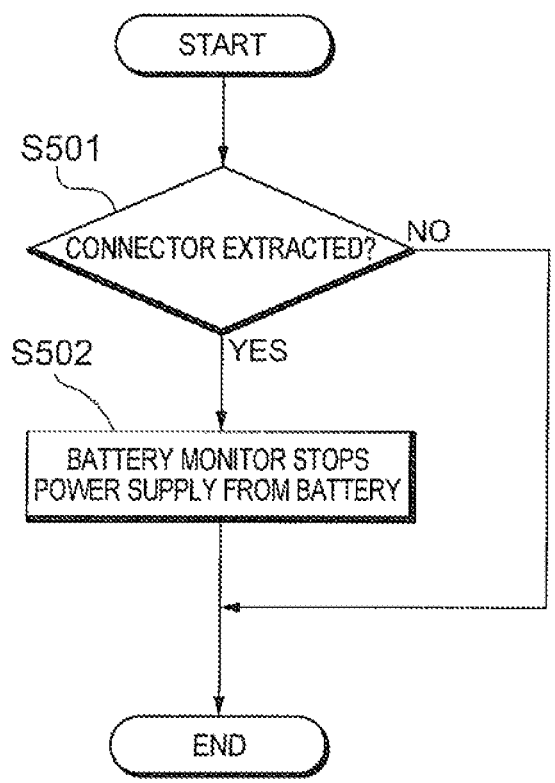
FIG. 10 is a flow chart depicting an operation when battery power supply stop processing is performed.

Now the operation of the battery power supply stopping processing will be described with reference to FIG. 10. This operation is repeatedly executed during backup processing by the battery.

First the insertion/extraction detection unit 610 determines whether the connectors 601 and 602 are extracted (step S501). If this determination is NO (step S501: NO), the processing ends.

If it is determined that the connectors 601 and 602 are extracted in step S501 (step S501: YES), on the other hand, the battery monitor 102 stops power supply by the battery 100 (step S502).

Thereby discharge of the battery 100 can be stopped if the disk array control unit 12 is detached in the middle of backup processing by the battery 100.

In the disk array apparatus 1, a program for implementing the above mentioned functions of each unit has been installed. By executing this program, the functions of each unit can be implemented.

The above mentioned embodiments are merely examples, and do not exclude various modifications and technologies not explicitly stated in the embodiments. In other words, numerous modifications can be made without departing from the true spirit and scope of the invention.

For example, the disk array apparatus 1 need not have all the components (see FIG. 1) of the above mentioned embodiment. The disk array apparatus 1 only requires having at least: the disk array control unit 12 having the CPU 110, CHE 210 (MEM 200), battery 100, battery monitor 102, connectors 601 and 602 and the insertion/extraction detection unit 610; the power supply unit 10; and the disk enclosure 14 having a hard disk.

Thereby the battery monitor 102 can stop power supplied by the battery 100 when the insertion/extraction detection unit 610 detected the extraction of the connectors 601 and 602. In other words, the continuation of the power ON state by the battery 100 can be prevented even if the disk array control unit 12 is detached when the battery is driven.

An exemplary advantage according to the invention is, safety can be improved.

The whole or part of the exemplary embodiments disclosed above can be described as, but not limited to, the following supplementary notes.

(Supplementary note 1) A disk array apparatus, including: a storage unit for storing data which is transmitted from a host device; a volatile storage unit for temporarily storing the data transmitted/received between the host device and the storage unit; a data control unit for controlling transmission/reception of the data; a power supply unit for supplying power, which is supplied from an external power supply, to the volatile storage unit and the data control unit; a battery unit for supplying power to the data control unit and the volatile storage unit when power being supplied from the external power supply is shut OFF without executing power supply shut down processing; an insertion/extraction detection unit for detecting insertion/extraction of a connector used for connecting the data control unit and the volatile storage unit with the power supply unit; and a discharge stopping unit for stopping power supply by the battery unit when extraction of the connector is detected by the insertion/extraction detection unit while the battery unit is supplying power to the data control unit and the volatile storage unit.

(Supplementary note 2) The disk array apparatus according to Supplementary note 1, further including: a nonvolatile storage unit for saving the data; and a data save control unit for causing the nonvolatile storage unit to store the data stored in the volatile storage unit when power being supplied from the external power supply is shut OFF without executing the power supply shut down processing.

(Supplementary note 3) The disk array apparatus according to Supplementary note 2, wherein the data save control unit causes the nonvolatile storage unit to store the data stored in the volatile storage unit after a predetermined time is elapsed since the power being supplied from the external power supply is shut OFF without executing the power supply shut down processing or when the residual capacity of the battery unit becomes less than a predetermined lower limit capacity.

(Supplementary note 4) The disk array apparatus according to Supplementary note 2 or Supplementary note 3, further including: a power supply control unit for performing control so as to supply power to each volatile storage unit, wherein when the power being supplied from the external power supply is shut OFF without executing the power supply shut down processing, the power supply control unit switches the power supply to the volatile storage unit to power saving mode, and cancels the power saving mode in a part of the volatile storage unit when the data stored in the volatile storage unit is stored in the nonvolatile storage unit, and the data save control unit causes the nonvolatile storage unit to store the data stored in the part of the volatile storage unit for which the power saving mode is canceled.

(Supplementary note 5) A method executed by a disk array apparatus having: a storage unit for storing data which is transmitted from a host device; a volatile storage unit for temporarily storing the data transmitted/received between the host device and the storage unit; a data control unit for controlling transmission/reception of the data; a power supply unit for supplying power, which is supplied from an external power supply, to the volatile storage unit and the data control unit; and a battery unit capable of supplying power to the data control unit and the volatile storage unit, comprising the steps of: starting power supply by the battery unit to the data control unit and the volatile storage unit when the power being supplied from the external power supply is shut OFF without executing power supply shut down processing; detecting insertion/extraction of a connector used for connecting the data control unit and the volatile storage unit with the power supply unit while the battery unit is supplying power to the data control unit and the volatile storage unit; and stopping power supply by the battery unit when extraction of the connector is detected.

(Supplementary note 6) A program for causing a computer to execute each step according to Supplementary note 5.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A disk array apparatus, comprising:
a storage unit for storing data which is transmitted from a host device;
a plurality of volatile storage units for temporarily storing the data transmitted/received between the host device and the storage unit;
a data control unit for controlling transmission/reception of the data;
a power supply unit for supplying power, which is supplied from an external power supply, to the plurality of volatile storage units and the data control unit;
a battery unit for supplying power to the data control unit and the volatile storage unit when power being supplied from the external power supply is shut OFF without executing power supply shut down processing;
wherein a power supply control unit switches the power supply to the plurality of volatile storage unit to power saving mode when the power being supplied from the external power supply is shut OFF without executing the power supply shut down processing, and cancels the power saving mode in a part of the volatile storage unit of the plurality of volatile storage units when the data stored in the part of the volatile storage unit is stored in the nonvolatile storage unit; and
the data save control unit causes the nonvolatile storage unit to store the data stored in the part of the volatile storage unit for which the power saving mode is canceled.

2. The disk array apparatus according to claim 1, further comprising:
a nonvolatile storage unit for saving the data; and
a data save control unit for causing the nonvolatile storage unit to store the data stored in the volatile storage unit when power being supplied from the external power supply is shut OFF without executing the power supply shut down processing.

3. The disk array apparatus according to claim 1, wherein the power control by the power supply control unit is repeated until the nonvolatile storage unit stores all the data which are stored in the plurality of volatile storage units.

4. The disk array apparatus according to claim 1, further comprising:
an insertion/extraction detection unit for detecting insertion/extraction of a connector used for connecting the data control unit and the volatile storage unit with the power supply unit; and
a discharge stopping unit for stopping power supply by the battery unit when extraction of the connector is detected by the insertion/extraction detection unit while the battery unit is supplying power to the data control unit and the volatile storage unit.

5. The disk array apparatus according to claim 2, wherein the data save control unit causes the nonvolatile storage unit to store the data stored in the volatile storage unit after a predetermined time is elapsed since the power being supplied from the external power supply is shut OFF without executing the power supply shut down processing or when the residual capacity of the battery unit becomes less than a predetermined lower limit capacity.

6. A method executed by a disk array apparatus having: a storage unit for storing data which is transmitted from a host device; a volatile storage unit for temporarily storing the data transmitted/received between the host device and the storage unit; a data control unit for controlling transmission/reception of the data; a power supply unit for supplying power, which is supplied from an external power supply, to the volatile storage unit and the data control unit; and a battery unit capable of supplying power to the data control unit and the volatile storage unit, comprising the steps of:

starting power supply by the battery unit to the data control unit and the volatile storage unit when the power being supplied from the external power supply is shut OFF without executing power supply shut down processing;

detecting insertion/extraction of a connector used for connecting the data control unit and the volatile storage unit with the power supply unit while the battery unit is supplying power to the data control unit and the volatile storage unit; and stopping power supply by the battery unit when extraction of the connector is detected.

\* \* \* \* \*